US010530850B2

(12) United States Patent
Fernandez et al.

(10) Patent No.: US 10,530,850 B2
(45) Date of Patent: *Jan. 7, 2020

(54) DYNAMIC CALL CONTROL

(71) Applicant: GENESYS TELECOMMUNICATIONS LABORATORIES, INC., Daly City, CA (US)

(72) Inventors: Alberto Fernandez, Homestead, FL (US); Vadim Snitkovsky, Rockville, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/865,198

(22) Filed: Jan. 8, 2018

(65) Prior Publication Data

US 2018/0159923 A1    Jun. 7, 2018

Related U.S. Application Data

(63) Continuation of application No. 15/088,076, filed on Mar. 31, 2016, now Pat. No. 9,866,698, which is a continuation of application No. 14/039,524, filed on Sep. 27, 2013, now Pat. No. 9,307,080.

(51) Int. Cl.
*H04M 3/00* (2006.01)
*H04L 29/08* (2006.01)
*H04M 3/493* (2006.01)
*H04M 3/36* (2006.01)
*H04M 3/523* (2006.01)
(Continued)

(52) U.S. Cl.
CPC ........ *H04L 67/1012* (2013.01); *H04M 3/367* (2013.01); *H04M 3/493* (2013.01); *H04M 3/527* (2013.01); *H04M 3/5237* (2013.01); *H04L 41/5019* (2013.01); *H04M 2203/402* (2013.01)

(58) Field of Classification Search
CPC ............ H04L 67/1012; H04L 41/5019; H04M 3/527; H04M 3/367; H04M 2203/402
See application file for complete search history.

(56) References Cited

U.S. PATENT DOCUMENTS 6,078,652 A  6/2000 Barak
6,263,051 B1  7/2001 Saylor et al.
(Continued)

OTHER PUBLICATIONS

International Search Report and Written Opinion for Application No. PCT/US2011/033505, dated Aug. 2, 2011, 11 pages.
(Continued)

*Primary Examiner* — Solomon G Bezuayehu

(57) ABSTRACT

A request to establish a voice communications session between a user of a telephonic device and an interactive voice response (IVR) system of a call handling system is received by a dynamic call control engine. A resource requirement for the voice communications session is determined. Resource usage data for multiple call handling systems is accessed by the dynamic call control engine. A particular call handling system from among the multiple call handling systems is selected based on the resource usage data and the resource requirement. A connection to be set up between the telephonic device and the particular call handling system to allow the user of the telephonic device to participate in the voice communications session with an IVR system of the particular call handling system is enabled.

20 Claims, 4 Drawing Sheets

(51) Int. Cl.
*H04M 3/527* (2006.01)
*H04L 12/24* (2006.01)

(56) References Cited

U.S. PATENT DOCUMENTS

| | | | |
|---|---|---|---|
| 6,373,836 B1 * | 4/2002 | Deryugin | G06F 11/1008 |
| | | | 348/E7.082 |
| 6,449,270 B1 | 9/2002 | Miloslavsky | |
| 6,519,246 B1 * | 2/2003 | Strahs | H04M 3/493 |
| | | | 370/352 |
| 6,587,547 B1 | 7/2003 | Zirngibl et al. | |
| 6,606,596 B1 | 8/2003 | Zirngibl et al. | |
| 6,658,093 B1 | 12/2003 | Langseth et al. | |
| 6,687,241 B1 * | 2/2004 | Goss | H04L 29/06 |
| | | | 370/352 |
| 6,765,997 B1 | 7/2004 | Zirngibl et al. | |
| 6,768,788 B1 | 7/2004 | Langseth et al. | |
| 6,788,768 B1 | 9/2004 | Saylor et al. | |
| 6,798,867 B1 | 9/2004 | Zirngibl et al. | |
| 6,829,334 B1 | 12/2004 | Zirngibl et al. | |
| 6,836,537 B1 | 12/2004 | Zirngibl et al. | |
| 6,850,603 B1 | 2/2005 | Eberle et al. | |
| 6,873,693 B1 | 3/2005 | Langseth et al. | |
| 6,885,734 B1 | 4/2005 | Eberle et al. | |
| 6,895,084 B1 | 5/2005 | Saylor et al. | |
| 6,940,953 B1 | 9/2005 | Eberle et al. | |
| 6,964,012 B1 | 11/2005 | Zirngibl et al. | |
| 6,977,992 B2 | 12/2005 | Zirngibl et al. | |
| 7,020,251 B2 | 3/2006 | Zirngibl et al. | |
| 7,082,422 B1 | 7/2006 | Zirngibl et al. | |
| 7,197,461 B1 | 3/2007 | Eberle et al. | |
| 7,263,177 B1 | 8/2007 | Paterik et al. | |
| 7,266,181 B1 | 9/2007 | Zirngibl et al. | |
| 7,272,212 B2 | 9/2007 | Eberle et al. | |
| 7,340,040 B1 | 3/2008 | Saylor et al. | |
| 7,428,302 B2 | 9/2008 | Zirngibl et al. | |
| 7,440,898 B1 | 10/2008 | Eberle et al. | |
| 7,457,397 B1 | 11/2008 | Saylor et al. | |
| 7,486,780 B2 | 2/2009 | Zirngibl et al. | |
| 7,970,118 B2 * | 6/2011 | O'Dell, III | H04M 3/5237 |
| | | | 379/265.02 |
| 8,041,575 B2 | 10/2011 | Agarwal et al. | |
| 8,238,533 B2 | 8/2012 | Blackwell et al. | |
| 8,300,798 B1 | 10/2012 | Wu et al. | |
| 2003/0144843 A1 | 7/2003 | Belrose | |
| 2004/0117804 A1 | 6/2004 | Scahill et al. | |
| 2005/0047559 A1 | 3/2005 | Colson et al. | |
| 2005/0141679 A1 | 6/2005 | Zirngibl et al. | |
| 2005/0165930 A1 * | 7/2005 | Whitman, Jr. | G06Q 10/06311 |
| | | | 709/226 |
| 2007/0198368 A1 * | 8/2007 | Kannan | G06Q 10/0631 |
| | | | 705/26.41 |
| 2007/0250841 A1 | 10/2007 | Scahill et al. | |
| 2007/0286162 A1 | 12/2007 | Fabbrizio et al. | |
| 2008/0065390 A1 | 3/2008 | Ativanichayaphong et al. | |
| 2009/0135812 A1 * | 5/2009 | Wang | H04M 3/42323 |
| | | | 370/352 |
| 2009/0138269 A1 | 5/2009 | Agarwal et al. | |
| 2009/0182556 A1 | 7/2009 | Reckase et al. | |
| 2011/0286586 A1 | 11/2011 | Saylor et al. | |
| 2011/0293078 A1 | 12/2011 | Saylor et al. | |
| 2013/0272511 A1 * | 10/2013 | Bouzid | H04M 3/493 |
| | | | 379/88.01 |
| 2014/0314225 A1 * | 10/2014 | Riahi | G06Q 30/02 |
| | | | 379/265.09 |
| 2014/0337527 A1 | 11/2014 | Jain | |

OTHER PUBLICATIONS

U.S. Non-Final Office Action for U.S. Appl. No. 13/092,090, dated May 9, 2013, 12 pages.
U.S. Non-Final Office Action for U.S. Appl. No. 13/092,101, dated Mar. 11, 2013, 12 pages.

* cited by examiner

DYNAMIC CALL CONTROL

CROSS-REFERENCE TO RELATED APPLICATION

This application is a continuation of U.S. patent application Ser. No. 15/088,076, filed on Mar. 31, 2016, now U.S. Pat. No. 9,866,698, which is a continuation of U.S. patent application Ser. No. 14/039,524, filed on Sep. 27, 2013, now U.S. Pat. No. 9,307,080, the content of all of which are incorporated herein by reference.

TECHNICAL FIELD

The following disclosure relates generally to selecting a call handling system in an interactive voice response system.

SUMMARY

In a general aspect, a request to establish a voice communications session between a user of a telephonic device and an interactive voice response (IVR) system of a call handling system is received by a dynamic call control engine. A resource requirement for the voice communications session is determined. Resource usage data for multiple call handling systems is accessed by the dynamic call control engine. A particular call handling system from among the multiple call handling systems is selected based on the resource usage data and the resource requirement. A connection to be set up between the telephonic device and the particular call handling system to allow the user of the telephonic device to participate in the voice communications session with an IVR system of the particular call handling system is enabled.

Implementations may include one or more of the following features. For example, a service level agreement associated with the voice communications session may be accessed, and an additional resource requirement for the voice communications session may be determined based on the service level agreement.

The resource requirement for the voice communications session may be allocated, by the dynamic call control engine. The connection between the telephonic device and the particular call handling system may be set up. After setting up the connection between the telephonic device and the particular call handling system, the resource requirement may be accessed by the IVR system of the particular call handling system. To allocate the resource requirement for the voice communications session, metadata indicating the resource requirement to an interaction flow document associated with the voice communications session may be added.

The multiple call handling systems may be associated with a first data center. The resource usage data of the multiple call handling systems do not satisfy the resource requirement for the voice communications session may be determined, and in response to determining that the resource usage data of the multiple call handling systems do not satisfy the resource requirement, the request may be forwarded to a second data center. To forward the request to a second data center, a call handling system of the second data center satisfies the resource requirement before forwarding the request may be determined.

The resource requirement may include one or more of a CPU usage, a memory usage, an average handle time, one or more speech resources, a throughput, a network congestion, and a concurrency. The one or more speech resources may include one or more of an automated speech recognition (ASR) engine, a text to speech (TTS) engine, a noise reduction engine, a voice recording engine, and an answering machine detection engine.

The resource usage data may be monitored by a resource monitoring system, the resource usage data may be stored in a resource usage database. To monitor the resource usage data, the resource usage data may be monitored for the call handling systems associated with a data center. To monitor the resource usage data, the resource usage data may be monitored for the call handling systems associated with multiple data centers.

The particular call handling system may include multiple IVR systems. To select the particular call handling system, an IVR system of the multiple IVR systems may be selected. To select a particular call handling system from among the multiple call handling systems, a respective score for the respective call handling system may be determined for each respective call handling system of the multiple call handling systems based on the resource usage data associated with the respective call handling system. The particular call handling system may be selected based on the determined scores for the multiple call handling systems.

In another general aspect of a system includes one or more call handling systems, each call handling systems including one or more interactive voice response (IVR) systems. The system includes a dynamic call control engine configured to receive a request to establish a voice communications session between a user of a telephonic device and an IVR system, determine a resource requirement for the voice communications session, access resource usage data for multiple call handling systems, select a particular call handling system from among the multiple call handling systems based on the resource usage data and the resource requirement, and enable a connection to be set up between the telephonic device and the particular call handling system to allow the user of the telephonic device to participate in the voice communications session with a particular IVR system of the particular call handling system.

Implementations may include one or more of the following features. For example, the system may include a resource monitoring system configured to monitor the resource usage data, and a resource usage database configured to store the resource usage data.

The dynamic call control engine may be configured to access a service level agreement associated with the voice communications session, and determine an additional resource requirement for the voice communications session based on the service level agreement.

The dynamic call control engine may configured to allocate the resource requirement for the voice communications session and set up the connection between the telephonic device and the particular call handling system, and the particular IVR system may be configured to access the resource requirement after the connection between the telephonic device and the particular call handling system is set up.

In another general aspect, a system includes receiving, by a dynamic call control engine, a request to establish a voice communications session between a user of a telephonic device and an interactive voice response (IVR) system of a call handling system; determining a resource requirement for the voice communications session; accessing, by the dynamic call control engine, resource usage data for multiple call handling systems; selecting a particular call handling system from among the multiple call handling systems based on the resource usage data and the resource requirement; and enabling a connection to be set up between the telephonic device and the particular call handling system to allow the user of the telephonic device to participate in the voice communications session with an IVR system of the particular call handling system.

Implementations may include one or more of the following features. For example, the system may include accessing a service level agreement associated with the voice communications session by the dynamic call control engine, and determining, the dynamic call control engine, an additional resource requirement for the voice communications session based on the service level agreement.

The details of one or more implementations are set forth in the accompanying drawings and the description below. Other potential features and advantages will become apparent from the description, the drawings, and the claims.

BACKGROUND

A user may use a telephonic device to call a number that connects the user to an interactive voice response system. In a communications system, there may be multiple call handling systems that are capable of providing an interactive voice response system to the user, but the computation and resource usage of each call handling system may vary in real time. It may be useful if a communications system allows active and adaptive control of selecting call handling systems for users to ensure delivery of calls to the most appropriate call handling system with the required computation and resource usage.

DETAILED DESCRIPTION

Figure 1A:
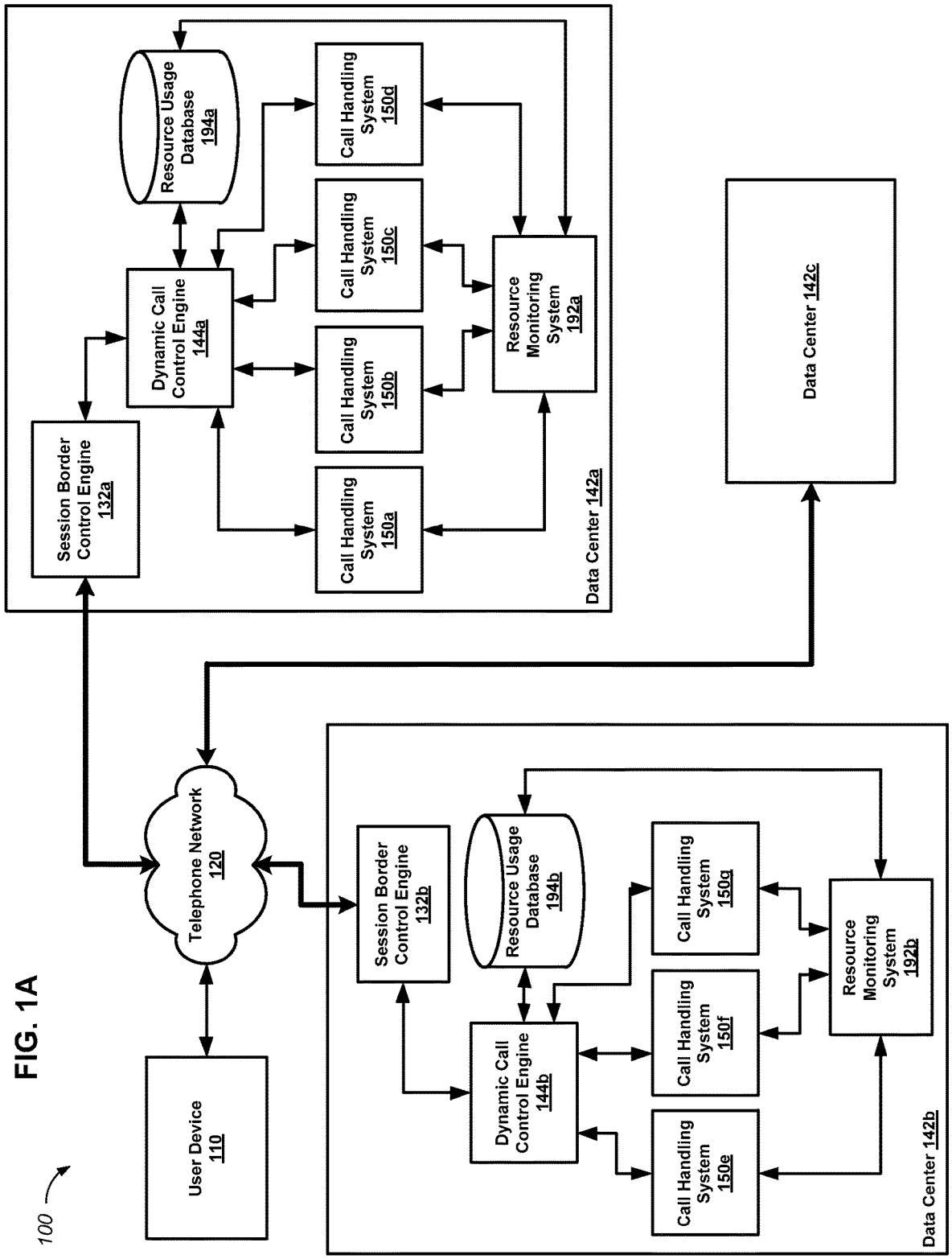
FIGS. 1A and 1B are block diagrams of a communications system that provides optimized dynamic call control for selecting call handling systems.

A user of a particular product or service may need to contact customer service for the product or service for various reasons, for example to troubleshoot a problem the user is experiencing in using the product or service. In order to contact the customer service and obtain a solution to the problem, the user may call a known customer service number for the product or service using a telephonic device accessible to the user. By calling the customer service number, the user may get connected to a call handling system that enables the user to interact with a voice site associated with the product or service. In a data center, there may be multiple call handling systems configured with computation and resource capabilities to enable the user to interact with the voice site, but the availability of the computation and resource capabilities for each call handling system may vary in real time depending on factors such as, for example, the number of callers simultaneously connected to the data center hosting the multiple call handling systems. The ability for a communications system to monitor the performance of call handling systems in the data centers and to control the routing of user calls to optimal call handling systems potentially may increase the quality of the user experiences with voice sites. In some implementations, a "call" may be a telephone call from a telephone device across a telephone network. In some other implementations, the term "call" may be used to refer to any contact, irrespective of whether it is from a telephone or over a telephone network, that results in the establishment of a voice communication session. For example, the user may make a call from a personal computing device across a data network to establish a voice communication session.

A voice site is a set of scripts or, more generally, programming language modules corresponding to one or more linked pages that collectively interoperate to produce an automated interactive experience with a user. A standard voice site includes scripts or programming language modules corresponding to at least one voice page and limits the interaction with the user to an audio communications mode. An enhanced voice site includes scripts or programming language modules corresponding to at least one voice page and at least one multimodal action page linked to the at least one voice page that enable interaction with the user to occur via an audio communications mode and at least one additional communications mode (e.g., a text communications mode, an image communications mode or a video communications mode). Notably, a call may be said to be directed to a voice site if it is directed to a telephone number that has been defined as corresponding to the voice site.

In the context of this discussion, a "page" is a discrete programming routine configured to perform a discrete function. A page may be defined by a user through an interaction with, for example, a GUI in which the user may indicate the type of programming routine for the page and may optionally further indicate one or more other pages linked to the page. Processing may then proceed to the one or more other linked pages after completion of execution of the page or, alternatively, after initiation of execution of the page but before completion of execution of the page. A page may be compiled into one or more programming language modules or scripts after the page is defined by the user through interaction with the GUI. The one or more programming language modules or scripts may be used, for example, by an IVR and/or an application server to execute the discrete programming routine to thereby perform the discrete function of the page. A "voice page" is a particular type of page that is configured to perform the function of delivering and/or receiving audible content to a user. The user is typically a caller to an IVR and the audible content is typically speech.

The voice site called by the user may be an automated interactive voice site that is configured to process, using pre-programmed scripts, information received from the user that is input through the telephonic device being used by the user, and, in response, provide information to the user that is conveyed to the user through the telephonic device. For standard voice sites and/or standard telephonic devices, the interaction between the user and the voice site may be done using an interactive voice response system (IVR) provided by a service provider that is hosting the voice site. A standard telephonic device in this context is understood to be a telephonic device that is not configured to handle interaction with a voice site that involves video, images or rich textual information. The IVR is configured to support voice commands and voice information using text-to-speech processing and natural language processing by using scripts that are pre-programmed for the voice site, such as, for example, voice-extensible markup language (VoiceXML) scripts. The IVR interacts with the user by prompting the user with audible commands and enabling the user to input information by speaking into the telephonic device or by pressing buttons on the telephonic device if the telephonic device supports dual-tone multi-frequency (DTMF) signaling (e.g., a touch-one phone). The information input by the user is conveyed to the IVR over a voice communications session that is established between the telephonic device and the IVR when the call is connected. Upon receiving the information, the IVR processes the information using the pre-programmed scripts. The IVR may be configured to send audible responses back to the user via the telephonic device.

In some implementations, the voice site may be an enhanced voice site that is configured to support multimedia information including audio, video, images and text. The telephonic device also may be an advanced telephonic device (e.g., a smart phone) provided with a display for conveying visual information to the user, and a processor capable of performing complex tasks such as logic processing wherein the associated instructions may be stored in memory included in the telephonic device. In such circumstances, the advanced telephonic device (hereinafter interchangeably referred to as "smart phone") and the enhanced voice site can interact using one or more of voice, video, images or text information and commands. Additional information about voice sites and enhanced voice sites may be found in copending application Ser. No. 13/919,136, which is incorporated herein by reference.

A multimodal IVR (MM-IVR) may be provided by the call handling service hosting the voice site to enable the smart phone and the voice site to communicate using one or more media (e.g., voice, text or images) as needed for comprehensive, easily-understood communications. In this context, "multimodal" refers to the ability to handle communications involving more than one mode, for example, audio communications and video communications. In one implementation, the MM-IVR may be configured to support calls to multiple different voice sites. In another implementation, the MM-IVR may be dedicated to one voice site and there may be a different MM-IVR for each voice site.

The smart phone may be configured to run a multimodal (MM) application that interacts with the MM-IVR that is supporting the voice site. In addition to placing a call to the voice site using a voice communications channel, the smart phone may interact with the voice site via the multimodal application using a data communications channel that runs in parallel to the voice communications channel. The audio (e.g., voice) capture and audio playing is done in the smart phone, but more complex and processing-intensive tasks such as speech or image recognition and dialog management are executed using the MM-IVR at the call handling service. For example, the MM-IVR may communicate with the user using voice over a voice communications session to get basic instructions and quick feedback; the MM-IVR also may communicate with the user using text over a parallel data communications session to get an e-mail address associated with the user and may additionally use images over the data communications session to provide a visual sense to the user of what needs to be done.

As mentioned previously, the voice site may be hosted by a third party service provider that facilitates the creation and hosting of voice sites on servers owned and operated by the service provider. The service provider provides a service/method that enables the design, development, and hosting of voice applications that run a thin client on the smart phone that interacts with a fully hosted, on-demand voice solution platform/call handling system maintained and managed by the service provider. The service/method provides a way to develop a voice site that is supported by an IVR/MM-IVR system (the server side) and push an installation of an application (the client) that would run on the smart phone, as well as a protocol for the client and the server to interact with each other. The service/method requires the installation of a thin client engine (e.g., an application) on the smart phone that mediates between the objects and devices in the smart phone and the IVR/MM-IVR system supporting the voice site hosted on the server.

In the above scenario, the role of the entity providing customer service through the voice site is that of a content provider. The customer service department of the entity/company (hereinafter referred to interchangeably as the "content provider") configures the voice site that is to be used for the particular product or service and provides the logic for the voice site that is to be executed by the IVR/MM-IVR system, along with the voice, video, image or textual information that may be exchanged with the user calling the voice site. The content provider may do so by using a graphical user interface provided by the third party service provider for configuring the voice site. The service provider handles the interpretation and compilation of the information provided by the content provider, and the creation and hosting of the voice site based on the information.

Depending on the voice application, each voice site (or enhanced voice site) may have different data processing requirements that require the voice site to leverage different speech resources, such as, for example, different Automatic Speech Recognition (ASR) engines, different Text-to-Speech (TTS) engines, and, in some instances, a noise reduction engine, a voice recording engine, and/or an answering machine detection engine. For instance, the data processing requirements for a pizza ordering application may be more complex than the data processing requirements for a customer satisfaction survey application and, therefore, may require speech resources able to handle a more sophisticated interaction with users. In this example, the pizza ordering application may, for instance, require a more sophisticated ASR engine that is better able to process natural language inputs to properly identify a long order of different pizzas with different toppings spoken by a user. In contrast, the customer satisfaction survey application may require a much less sophisticated ASR engine because the application only asks users multiple-choice questions that the users respond to by speaking single alphanumeric character answers.

In general, a call from a user is directed to a call handling system via a telephone network. Before connecting the user to the call handling system, the call is first routed to a data center hosting the call handling system. A data center typically hosts multiple call handling systems having capabilities to provide an IVR (or a MM-IVR) and required resources to process the communications between the user and the voice site. However, as described above, each voice site may have different data processing requirements, and during the time that the user initiates the call, the required resources may not be available to certain call handling systems due to other users occupying these call handling systems and/or resources, and the user may therefore experience a decreased quality for the voice communication session with the IVR, or may even experience a dropped call. For example, if a communications system includes a call control system that selects a call handling system for a user using a round robin selection scheme without considering the computation and resource usage of the call handling systems, the user's experience with the communications session may be compromised when the selected call handling system is overloaded and unable to provide the required resources for the user.

In addition, different content providers may have contracted different service level agreements (SLA) with the service provider, which may introduce further complexity for selecting call handling systems in the communications system. For example, a content provider for a department store application may have contracted with the service provider to provide a high concurrency requirement (i.e., how many calls can simultaneously access the application without being rejected) to minimize the potential loss in sales that may result from dropped calls. In contrast, a content provider for a customer surveying application may have contracted with the service provider for a SLA with a lower concurrency requirement to potentially save costs. As another example, the content provider for the department store application may have contracted with the service provider to provide a sophisticated ASR engine to its users during the voice communications sessions to ensure accurate product orders. The content provider for the customer satisfaction survey application, on the other hand, may have contracted for a less sophisticated ASR engine because only simple grammar processing is needed for its voice communications sessions.

A dynamic call control system, like that described in more detail below, may determine the data processing and resource needs for a given voice application, and may automatically select the best call handling system able to satisfy those needs (e.g., the call handling system with the highest computing power and memory availability to handle the data processing needs without compromising the user experience). The dynamic call control system may further identify the SLA associated with a particular voice application to further filter the selection of the call handling system. In doing so, the user experience with a voice site may improve by the user being assigned to a specific call handling system that is best able to serve the user's need in view of both the context of a particular voice interaction with the user as well as the current computation and resource usage of the call handling system.

FIG. 1A is a block diagram of an example communications system 100 that provides optimized dynamic call control for selecting call handling systems. The communications system 100 includes a user device 110, a telephone network 120, and one or more data centers 142.

The user device 110 is configured to establish voice communications sessions (e.g., by placing phone calls) across the telephone network 120. In some implementations, the user device 110 may also be configured to establish data communications sessions with servers, such as the application server 140 shown in FIG. 1B, across the data network 130 shown in FIG. 1B for transmitting and receiving data. The user device 110 may be a telephonic device (e.g., a landline phone, a cellular phone, or a mobile personal digital assistant (PDA) with embedded cellular phone technology). The user device 110 may be a computer that includes one or more software applications or hardware components for performing communications between the user device 110 and servers across the telephone network 120 and/or the data network 130. The user device 110 may have various input/output devices with which a user may interact to provide and receive audio, text, video, and other forms of data. For example, the user device 110 may include a screen on which may be displayed form data and with which the user may interact using a pointer mechanism to provide input to single-field or multi-field forms.

The telephone network 120 may include a circuit-switched voice network, a packet-switched data network, or any other network able to carry voice data. For example, circuit-switched voice networks may include a Public Switched Telephone Network (PSTN), and packet-switched data networks may include networks based on the Internet protocol (IP) or asynchronous transfer mode (ATM), and may support voice using, for example, Voice-over-IP, Voice-over-ATM, or other comparable protocols used for voice data communications.

The data center 142 is a facility for hosting one or more call handling systems 150 and associated components. A data center 142 may include a session border control engine 132, a dynamic call control engine 144, one or more call handling systems 150, a resource monitoring system 192, and a resource usage database 194. The example communications system 100 in FIG. 1A includes three data centers 142a, 142b, and 142c. The data center 142a includes the session border control engine 132a, the dynamic call control engine 144a, four call handling systems 150a, 150b, 150c, and 150d, the resource monitoring system 192a, and the resource usage database 194a. The data center 142b includes the session border control engine 132b, the dynamic call control engine 144b, three call handling systems 150e, 150f, and 150g, the resource monitoring system 192b, and the resource usage database 194b. The call handling systems 150 and associated components of the data center 142c are not shown in FIG. 1A. Note that the examples describe above are not limiting. In some implementations, a communications system may include any number of data centers, and a data center may include any number of call handling systems and/or associated components.

As used in this specification, an "engine" (or "software engine") refers to a software implemented input/output system that provides an output that is different from the input. An engine can be an encoded block of functionality, such as a library, a platform, a Software Development Kit ("SDK"), or an object.

The call handling system 150 may include a combination of resources configured to process voice information received from the user device 110, and to provide voice information to the user device 110. Examples of resources of the call handling system 150 are described in detail in FIG. 1B below. In some implementations, the call handling system 150 may additionally or alternatively include other resources that can be used to process other modes of information, such as video, images, and/or text.

The session border control engine 132 is configured to be a gateway between the user device 110 and the dynamic call control engine 144 in the data center 142. In some implementations, the session border control engine 132 may receive a request to initiate a voice communications session from the user device 110 via the telephone network 120, and may be configured to route the request to the dynamic call control engine 144. In some implementations, if a request to initiate a voice communications session is sent from a call handling system 150 to the user device 110, the session border control engine 132 may be configured to forward the request to the user device 110 via the telephone network 120. In some implementations, the session border control engine 132 may be configured to forward the request from the user device 110 to another data center 142. In some implementations, after a call handling system 150 is selected by the dynamic call control engine 144, the session border control engine 132 may be configured to establish a voice communications session between the user device 110 and the selected call handling system 150.

The dynamic call control engine 144 is configured to select the optimal call handling system 150 for the voice communications session based on the resource requirements of the voice communications session and the computation and resource usage of the call handling systems 150 in the data center 142 (e.g., the call handling systems 150a-150d in the data center 142a). In some implementations, the dynamic call control engine 144 may select the optimal call handling system 150 for a multi-modal communications session with an enhanced voice site. Alternatively or in addition, the dynamic call control engine 144 may use other types of data in selecting the call handling system 150. For example, the dynamic call control engine 144 may further determine the selection of the call handling system 150 based on a service level agreement (SLA) between the content provider of the voice site and the service provider.

The resource monitoring system 192 is configured to monitor the computation and resource usage of the call handling systems 150. In some implementations, the resource monitoring system 192 may be configured to monitor the computation and resource usage of call handling systems 150 in a data center 142. For example, the resource monitoring system 192a may be configured to monitor the computation and resource usage of the call handling systems 150a-150d in the data center 142a, and the resource monitoring system 192b may be configured to monitor the computation and resource usage of the call handling systems 150e-150g in the data center 142b. In some implementations, the resource monitoring system 192 may be configured to monitor the computation and resource usage of the call handling systems 150 across multiple data centers 142. For example, a resource monitoring system 192 may be configured monitor the computation and resource usage of call handling systems 150 in multiple data centers 142 in a geographic region.

In some implementations, the resource monitoring system 192 may be configured to generate computation usage data and resource usage data based on the monitored computation and resource usage. Some examples of computation usage data may include CPU usage of call handling systems 150, CPU usage of one or more components (e.g., IVRs and/or speech resources) of call handling systems 150, memory usage of call handling systems 150, and memory usage of one or more components of call handling systems 150. Some examples of resource usage data may include average handling time for a voice communications session, a concurrency (i.e., how many calls currently are connected to a call handling system) of a call handling system 150, the number of ports occupied by a particular resource of the call handling system 150, the number of licenses available for a speech resource (e.g., ASR and/or TTS), and one or more network conditions (e.g., congestion and/or throughput) of a call handling system 150.

In some implementations, the resource monitoring system 192 may be configured to monitor the computation and resource usage of the call handling systems 150 at a fixed time interval as configured by a system administrator. In some other implementations, the resource monitoring system 192 may be configured to monitor the computation and resource usage of the call handling systems 150 dynamically at a variable time interval as a function of call traffic in a data center 142. In some other implementations, the resource monitoring system 192 may be configured to monitor the computation and resource usage of the call handling systems 150 dynamically at the time of the request to establish the voice communications session.

The resource usage database 194 is configured to store usage data of the call handling systems 150. In some implementations, the resource monitoring system 192 may be configured to issue commands to store the usage data of the call handling systems 150 in the resource usage database 194. In some implementations, the resource usage database 194 may be configured to store usage data of each of the call handling systems 150. In some implementations, the resource usage database 194 may be configured to store usage data of the call handling systems 150 in an aggregation. For example, the resource usage database 194a may store an average CPU usage of the call handling system 150a over the previous twenty four hours. As another example, the resource usage database 194a may store an average CPU usage of the call handling systems 150a-150d over the previous twenty four hours. In some implementations, the resource usage database 194 may be configured to store usage data of multiple call handling systems 150 associated with one data center. In some implementations, the resource usage database 194 may be configured to store usage data of multiple call handling systems 150 in multiple data centers.

Figure 1B:
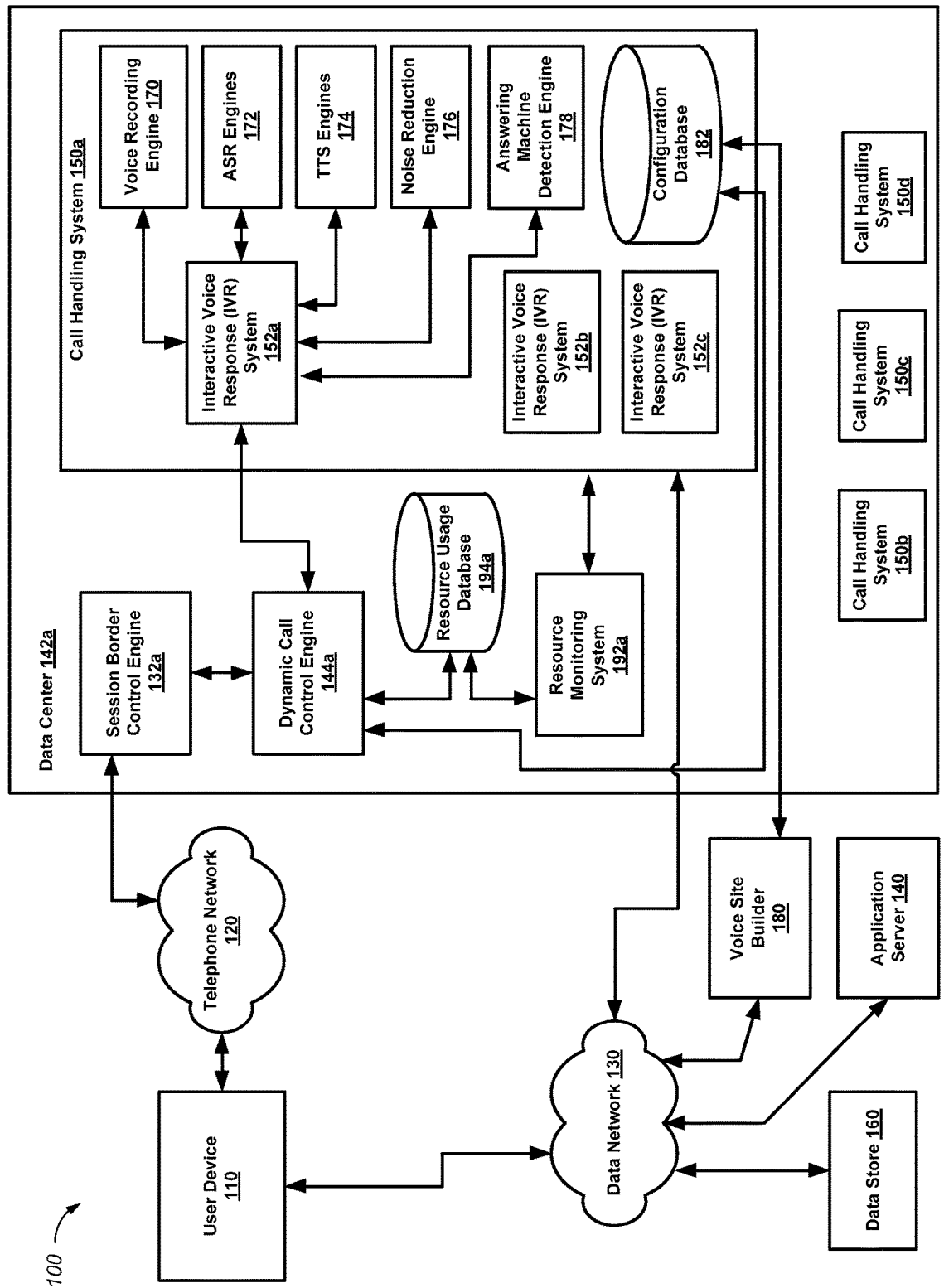

FIG. 1B further illustrates specific examples of speech resources that may be in an example call handling system 150a. The call handling system 150a includes three IVR systems 152a-152c, a voice recording engine 170, one or more ASR engines 172, one or more ASR engines 174, a noise reduction engine 176, an answering machine detection engine 178, and a configuration database 182. In some implementations, the call handling system 150a may additionally or alternatively include other resources that can be used to process other modes of information, such as video, images, and text. Other call handling systems 150 may have a different number of resources or may have different types of resources. For example, the call handling system 150b may not include an answering machine detection engine. As another example, the call handling system 150b may include four IVR systems instead of three. Note that although FIG. 1B shows that the speech resources are inside the call handling system 150a, in some implementations the speech resources may be implemented outside the call handling system 150a (e.g., in a cloud environment), where the call handling system 150a may access the speech resources remotely via a data network 130.

The IVR 152 (e.g., any one or more of IVR 152a, 152b, and/or 152c) may include a voice gateway coupled to a voice application system via a voice network. Alternatively, the voice gateway may be connected to the voice application system via a data network. The voice gateway is a gateway that receives user calls from or places calls to voice communications devices, such as the user device 110, and responds to the calls in accordance with a voice interaction. The voice interaction may be accessed from local memory within the voice gateway or from the application system. In some implementations, the voice gateway processes voice interactions that are script-based voice applications. The voice interaction, therefore, may be a script written in a scripting language such as, for example, voice extensible markup language (VoiceXML) or speech application language tags (SALT). The voice application system includes a voice application server and all computer systems that interface and provide data to the voice application server. The voice application system sends voice application programs or scripts to the voice gateway for processing and receives, in return, user responses. The user responses are analyzed by the voice application system and new programs or scripts that correspond to the user responses may then be sent to the voice gateway for processing. The voice application system may determine which programs or scripts to provide to the voice gateway based on some or all of the information received from the user device 110 via the application server 140. The IVR 152 also may be configured to communicate with the data store 160 to read and/or write user interaction data (e.g., state variables for a data communications session) in a shared memory space.

In some implementations, the dynamic call control engine 144 may be configured to select an IVR system 152 and/or allocate one or more speech resources for the selected call handling system 150 based on a set of static and/or dynamic data processing requirements associated with a voice site. In general, after determining the resource requirements of the voice site and the computation and resource usage of the call handling systems 150, the dynamic call control engine 144 selects a call handling system 150 and determines and provides to the selected call handling system 150 one or more port identifiers that identify the selected IVR system 152 and/or selected speech resources. A port is a data communication channel that the IVR system 152 may subsequently use to connect to and communicate with the identified speech resource to process voice data. In some implementations, port identifiers are stored in the configuration database 182.

The TTS engines 174 are one or more engines that are running software and hardware applications for performing text-to-speech conversions (e.g., ISPEECH™). In some implementations, when executing voice interactions, the IVR system 152 may access any one of the TTS engines 174 through a port identified by the corresponding voice page. In some other implementations, when executing voice interactions, the IVR system 152 may access any one of the TTS engines 174 through a port identified by the dynamic call control engine 144.

In some implementations, each TTS engine of the TTS engines 174 may include different engine attributes, where each engine attribute requires different computation complexity. The required engine attributes for a voice site may be stored in the configuration database 182. In some implementations, the engine attributes of a TTS engine may include one or more translation capabilities. For example, a particular TTS engine may be configured to convert text in English into speech in Spanish or another foreign language. In some implementations, the engine attributes of a TTS engine may include one or more symbol conversion capabilities. For example, a particular TTS engine may be configured to render symbolic linguistic representations (e.g., phonetic transcription) into speech. In some implementations, the engine attributes of a TTS engine may include one or more speech configuration capabilities. For example, a particular TTS engine may be configured to allow a content provider to select specific characteristics (e.g., pitch, speed, gender, accent, etc.) associated with the speech output. As another example, a particular TTS engine may be configured to allow a caller to select specific characteristics (e.g., pitch, speed, gender, accent, etc.) associated with the speech output.

The noise reduction engine 176 is configured to increase voice recognition accuracy by reducing background noise associated with the calling environment of a user. In some implementations, when executing voice interactions, the IVR system 152 may access the noise reduction engine 176 through a port identified by the corresponding voice page. In some other implementations, when executing voice interactions, the IVR system 152 may access the noise reduction engine 176 through a port identified by the dynamic call control engine 144.

In some implementations, noise reduction engines 176 in different call handling systems may include different engine attributes, where each engine attribute requires different computation complexity. The required engine attributes for a voice site may be stored in the configuration database 182. In some implementations, the engine attributes of a noise reduction engine may include one or more dynamic noise detection capabilities. For example, the noise level of a caller's environment may vary over the course of the voice communications session, and the noise reduction engine may be configured to detect and adjust the noise reduction output accordingly.

The voice recording engine 170 is configured to record the voice communications session between the user and the selected call handling system 152. In some implementations, when executing voice interactions, the IVR system 152 may access the voice recording engine 170 through a port identified by the corresponding voice page. In some other implementations, when executing voice interactions, the IVR system 152 may access the voice recording engine 170 through a port identified by the dynamic call control engine 144. In some other implementations, the voice recording engine 170 may be connected directly with the user device 110 without going through the IVR system 152.

In some implementations, voice recording engines 170 in different call handling systems may include different engine attributes, where each engine attribute requires different computation complexity. The required engine attributes for a voice site may be stored in the configuration database 182. In some implementations, the engine attributes of a voice recording engine may include one or more user emotion detection capabilities. For example, the voice recording engine may be configured to start recording if a negative emotion is detected from a user. In some implementations, the engine attributes of a voice recording engine may include one or more output configuration capabilities. For example, the voice recording engine may be configured to output the recorded voice communications session in a specific data format such as, for example, the MP3 format.

The answering machine detection engine 178 is configured to detect whether the voice input from the user device 110 is from an answering machine (which includes voicemail services). The answering machine detection engine 178 is typically used when the call handling system 150a is initiating the voice communications session to the user device 110. In some implementations, the answering machine detection engine 178 may be used in determining whether the voice input from a user device 110 initiated call is generated by a robot. In some implementations, when executing voice interactions, the IVR system 152 may access the answering machine detection engine 178 through a port identified by the corresponding voice page. In some other implementations, when executing voice interactions, the IVR system 152 may access the answering machine detection engine 178 through a port identified by the dynamic call control engine 144. In some other implementations, the answering machine detection engine 178 may be connected directly with the user device 110 without going through the IVR system 152.

The ASR engines 172 are one or more engines that are running software and/or hardware applications for performing automatic speech recognition (e.g., ISPEECH™, GOOGLE™, and NVOQ™). In some implementations, when executing voice interactions, the IVR system 152 may access any one of the ASR engines 172 through a port identified by the corresponding voice page. In some other implementations, when executing voice interactions, the IVR system 152 may access any one of the ASR engines 172 through a port identified by the dynamic call control engine 144.

As discussed above, each type of speech resource may have different computation (e.g., CPU and/or memory) requirements. For example, each ASR engine of the ASR engines 172 may include different engine attributes, where each engine attribute requires different computation complexity. The required engine attributes for a voice site may be stored in the configuration database 182.

In some implementations, the engine attributes of an ASR engine may include one or more speech types. A speech type may indicate the complexity of user speech that an ASR engine may recognize and process. Examples of speech types include, but are not limited to, basic ASR, dictation, and natural language. In some implementations, an ASR engine having an attribute of a basic ASR speech type may be configured to recognize a sentence within a known context. For example, the IVR system 152 has asked a user a question, and the context of voice interaction with the user is constrained by the question. In some implementations, an ASR engine having an attribute of a dictation speech type may be configured to render a user's speech into text automatically and without engaging in a spoken language exchange between the user and a voice application. In some implementations, an ASR engine having an attribute of a natural language type may be configured to allow a user to proactively provide voice data in a voice application without the IVR system 152 prompting the user to do so. For example, a pizza ordering application may allow the user to specify desired toppings before the IVR system 152 asks the user for such input.

In some implementations, the engine attributes of an ASR engine may include one or more support languages. A support language may indicate a specific language that an ASR engine may be configured to recognize. Examples of a support language include, but are not limited to, English, Spanish, French, and other foreign languages.

In some implementations, the engine attributes of an ASR engine may include one or more channel types. A channel type may indicate whether an ASR engine is configured to support speech recognition only, or an ASR engine is configured to support speech recognition assisted by information provided by the user using other modes (e.g., text). For example, the voice recognition accuracy may improve if an ASR engine can process text information provided by the user, which may provide additional context for recognizing the voice data. For instance, a user may be asked during a voice interaction to provide a ticket ID that is an alphanumeric string (e.g., "72HB8C2"). In such instances, depending on the numbers and characters allowed, speech responses may have a high level of misrecognition (e.g., the "H" may be mistaken for an "8", the "8" for "H", or the "C" for the "Z"). In such instances, the user may be asked to enter their ticket ID by responding to an SMS that was sent to them during the call. The user may respond by typing that ID and the IVR/Voice interaction may proceed on from that point.

In some implementations, the engine attributes of an ASR engine may include a cost per transaction. In general, a service provider may charge a content provider based on the speech resources used by the IVR system 152 during a voice interaction with a user. For example, the cost may be associated with the complexity of the required voice data. For instance, a high premium may be charged for voice interactions requiring large grammars (e.g., City and State), or complex grammars (e.g., full physical addresses), or Natural language grammars (e.g., the ability of the user to express themselves without any unnatural constraints in how them may express themselves, for the purpose of describing a type of problem). A lesser premium may be placed on interactions that require moderately sophisticated but very well behaved grammars (e.g., dates, currency, credit card numbers), and then an even lesser premium for simple grammars (e.g., phone numbers, digit sequences), with the least complex being a small set of keywords or phrases (e.g., "What is your favorite color?"). As another example, the cost may be associated with additional functionality provided by a speech resource (e.g., an ASR engine that provides an optional biometrics feature may result in a higher cost when the optional biometrics feature is enabled). As another example, the cost may be associated with an arrangement between the service provider and external developers of the speech resources (e.g., a service provider may pay an external developer each time an IVR system is connected to an ASR engine, or the service provider may pay the external developer a flat fee each year.)

In some implementations, the engine attributes of an ASR engine may include recognition accuracy of the ASR engine. An ASR engine with a higher recognition accuracy attribute provides greater accuracy in recognizing the content of spoken input than an ASR engine with a lower recognition accuracy attribute. In general, an ASR engine produces a confidence level or score after processing voice data that reflects the likelihood that the content identified by the ASR engine as corresponding to the voice data in fact does correspond to the voice data. In some implementations, the ASR engine may determine that there are multiple possible interpretations for the received voice data, and the ASR engine may assign a separate score to each of the possible interpretations to reflect the differing respective likelihoods that each corresponding interpretation correctly identifies the content of the spoken input. In some implementations, an ASR's recognition accuracy attribute or attributes is specific to speech type such that the ASR has a different recognition accuracy attribute for each of one or more different speech types. In some implementations, an ASR having a higher recognition accuracy attribute may indicate that the ASR engine is better able to accurately analyze voice data in the presence of more background noise than an ASR having a lower recognition accuracy attribute.

In some implementations, the engine attributes of an ASR engine may include additional security features supported by the ASR engine. For example, an ASR engine may be configured to support biometrics features, which allow the ASR engine to securely verify the identity of a caller by analyzing voice characteristics of the caller.

In some implementations, the engine attributes of an ASR engine may include interaction types. An interaction type may indicate what type of voice interaction an ASR engine is configured to process. Examples of interaction types include, but are not limited to, directed dialog and mixed initiative. In some implementations, an ASR engine having an attribute of directed dialog interaction type may be configured to require that the IVR system 152 exchange voice information with the user using a step-by-step, question-and-answer type of voice interaction. In some implementations, an ASR engine having an attribute of mixed initiative interaction type may be configured to allow a user to initiate a conversation using natural language before the IVR system 152 prompts a specific question to the user.

In some implementations, the engine attributes of an ASR engine may include other features supported by the ASR engine. For example, an ASR engine may be configured to support a feature that is specifically designed to process voice information having characteristics of a high pitch. As another example, an ASR engine may be configured to support a built-in feature for background noise reduction.

In some implementations, the resource usage requirements for a voice communication session may include an identification of the attributes of each speech resource required for the voice site, including the attributes of any speech resources required for particular voice pages within the voice site. The resource usage requirements may be used by the dynamic call control engine 144 to select from among different call handling systems. For example, the speech resource requirements may specify that the voice site requires an ASR engine that can handle natural language processing in English, and an ASR engine that can handle basic ASR in Spanish. The former may be required, for example, for processing the voice interaction corresponding to voice page #2100 of the voice site and the latter may be required for processing the voice interaction corresponding to voice page #4500 of the voice site. Some call handling systems may not have IVRs capable of accessing ASR engines that satisfy these requirements and, therefore, may not be selected for handling voice communication sessions for this voice site. The voice site also may require a TTS engine that is able to convert text to spoken Spanish. Some call handling systems may not have IVRs capable of accessing such a TTS engine and, therefore, also may be excluded from handling voice communication sessions for this voice site. The resource requirements related to one or more speech resources, therefore, may be used by the dynamic call control engine 144 to filter out call handling systems.

Notably, in some implementations, each engine of a call handling system has a number of available ports. The number of available ports may be used by the dynamic call control engine 144 as a factor in determining whether to select a given call handling system or a given IVR within a call handling system. For example, if there are no available ports of a given engine of a particular call handling system that is required for the voice communication session, the dynamic call control engine 144 may not select that call handling system or any IVR within that call handling system for processing the voice communication session. In some implementations, the number of available ports may be used as a scoring factor in ranking among multiple different call handling systems or IVRs that otherwise have access to all of the engines/resources required for the voice communication session.

Resource requirements with respect to speech resources may be specified by a voice site designer (i.e., a content provider) while designing the voice site as global parameters for the voice site that are used any time the speech resource is invoked by any given voice page of the voice site and, additionally or alternatively, as voice page-specific parameters. For example, a voice site designer may select a TTS engine capable of converting text to Spanish for a voice site by setting a voice site global parameter that specifies the desired TTS engine capability. In this way, the voice site designer indicates that any TTS conversion operation of the voice site should use the globally-specified TTS engine able to convert text to spoken Spanish. The same voice site designer also may select an ASR engine having basic ASR capabilities able to recognize Spanish for voice page #3300 of the voice site by setting a corresponding voice page-specific parameter for voice page #3300 and an ASR engine having natural language processing capabilities able to recognize Spanish for voice page #7000 of the voice site by setting a corresponding voice page-specific parameter for voice page #7000. The resource requirements with respect to speech resources specified by the voice site designer for the voice site, therefore, indicate that a call handling system or IVR selected for handling a voice communication session with the voice site is required to be able to access a TTS engine able to convert text to spoken Spanish, an ASR engine having a basic ASR engine able to recognize Spanish, and an ASR engine having natural language processing capabilities able to recognize Spanish.

As noted above, the resource requirements may specify the speech resources that are required to be accessible to the IVR of a call handling system that will be handling a voice communication session between a user and the voice site. Additionally or alternatively, the resource requirements may specify parameters related to the CPU usage, concurrency, and memory usage of the IVR used by the call handling system to process the voice communication session. Additionally or alternatively, the resource requirements may specify parameters related to the CPU usage, concurrency, and memory usage of the speech resources accessed by the IVR to process the voice communication session.

In some implementations, a call handling system only has a single IVR. In other implementations, a call handling system may have multiple IVRs. Each IVR handles a different call volume at a given time. As such, the IVR systems, at any given time, may each be using a certain amount of its CPU resources and its memory resources and may each be handling a certain volume of calls concurrently. This IVR resource usage at any given time may be, for example, stored in the resource usage database 194 of the data center and/or may be averaged over a period of time (e.g., an hour or a day) prior to being stored in the resource usage database 194. Moreover, each IVR system may have access to a different set of speech resources (e.g., ASR engines, TTS engines, etc.). In some implementations, the number of available ports of each accessible speech resource also may be stored in the resource usage database 194 as a parameter-specific to the speech resource (e.g., ASR engine #12 has 27 ports currently available) and/or specific to an IVR system's capability to access that speech resource (e.g., IVR system #2 is able to currently access 12 ports of ASR engine #7). In some implementations, the number of available ports may be averaged over a period of time (e.g., 1 minute, 1 hour, and 1 day) before being stored in the resource usage database 194.

Notably, the IVR resource usage may impact a caller's experience when interacting with the IVR (e.g., IVRs that are more overloaded (i.e., using more resources) will be slower in responding to callers). As such, any and all of this resource usage information may be used by the dynamic call control engine 144 to improve the caller experience with a voice site by selecting, based on this resource usage information, the appropriate call handling system from among multiple call handling systems and/or the appropriate IVR from among multiple IVRs within one or more call handling systems for processing the voice communication session of the voice site.

As noted above, the voice site designer may specify the speech resources that are required to be accessible to the IVR system that will be handling a voice communication session between a user and the voice site. In some implementations, the voice site designer may additionally or alternatively specify the CPU usage, concurrency, and memory usage of the IVR system used by the call handling system to process the voice communication session. For example, the voice site designer may specify that a user call is not to be connected to a particular IVR system if the number of callers connected to the IVR system exceeds a threshold number. As another example, the voice site designer may specify that the voice page would require a minimum memory and/or CPU availability in order to be executed the voice page without affecting the quality of the voice interaction.

In some other implementations, the concurrency, memory, and CPU requirements may be determined by the dynamic call control engine 144a based on the speech resource requirements provided by the voice site designer. For example, the voice site designer may specify that an advanced ASR engine for processing natural speech is required for a particular voice page, and the dynamic call control engine 144a may determine the CPU and memory usage requirements for the advanced ASR engine by querying the configuration database 182.

The specified CPU usage, concurrency and memory usage may then be used to select from among multiple different candidate call handling systems. For example, when using the above-noted requirements, the dynamic call control engine 144 may not select a call handling system that, before the establishment of the voice communications session, does not have an IVR system that satisfies the concurrency requirements of the voice site. In addition or alternatively, the above-noted requirements may be used for scoring each call handling system or IVR. The dynamic call control engine 144 may then select the call handling system and corresponding IVR having the highest score for processing the voice communication session of the voice site.

In some implementations, the selection of resources for a given voice site or voice sites is specified by a service level agreement (SLA) with a content provider. The SLA is an overarching agreement between the content provider and the service provider that will be applicable to all (or a pre-agreed upon subset of) voice sites designed by or for the content provider. For example, the SLA with the content provider may specify that the best ASR engine having natural language processing capabilities will be used for all ASR operations in all (or a pre-agreed upon subset) of the voice sites designed by or for the content provider. An SLA also may specify resource requirements related to the IVR processing, such as the CPU usage, concurrency, and memory usage of the IVR system that will process voice communications for the voice sites of the content provider. For example, the SLA may provide the content provider with a "platinum service" package that indicates that specifies guaranteed requirements for processing the voice site designed by the content provider such as, for example, a maximum concurrency rate of a call handling system and/or the types of speech resources that are to be selected and provided to user devices accessing the voice site.

The communications system 100 may further include a data network 130, an application server 140, a data store 160, and a voice site builder 180.

The data network 130 is configured to enable direct or indirect communications between the user device 110, the application server 140, and the call handling system 150 (or the IVR 152). Examples of the data network 130 include the Internet, Wide Area Networks (WANs), Local Area Networks (LANs), analog or digital wired and wireless telephone networks (e.g., Public Switched Telephone Network (PSTN), Integrated Services Digital Network (ISDN), and Digital Subscriber Line (xDSL)), radio, television, cable, satellite, and/or any other delivery or tunneling mechanism for carrying data.

In some implementations, the data network 130 and the telephone network 120 are implemented by a single or otherwise integrated communications network configured to enable voice communications between the user device 110 and the call handling system 150 (or the IVR 152), and to enable communications between the user device 110, the application server 140, and the call handling system 150.

The application server 140 is configured to establish a data communications session with the user device 110 and to receive and send data to the user device 110 across the data network 130. The application server 140 also is configured to communicate with the call handling system 150 to send data received from the user device 110 to the IVR 152. The application server 140 also may send other application-related data that did not originate from the user device 110 to the IVR 152 or, more generally, to the call handling system 150. The application server 140 also is configured to communicate with the data store 160 to read and/or write user interaction data (e.g., state variables for a data communications session) in a shared memory space. The application server 140 may be one or more computer systems that operate separately or in concert under the direction of one or more software programs to perform the above-noted functions. In some implementations, the application server 140 and the call handling system 150 are a single integrated computer system.

The voice site builder 180 is configured to provide application development tools to third party content providers for creating voice sites. The voice site builder 180 may be implemented, for example, as a special-purpose or a general-purpose computer configured to access instructions included in one or more programming modules that are stored on a computer-readable storage medium. The instructions, when executed by the computer, enable the computer to communicate with a content provider computing device to enable the content provider computing device to provide a user interface with which a user of the content provider computing device may interact to create a voice site using the application development tools. In one implementation, the content provider computer is a desktop computer that uses a browser program (e.g., a Web browser) to access the voice site builder 180 across the data network 130 (e.g., the Internet). In some implementations, a content provider may use the voice site builder 180 to configure data processing requirements associated with a voice page, and the configured data processing requirements may be stored in a configuration database 182.

In some implementations, the voice site builder 180 resides in a server (e.g., a Web server) separate from but in communication with the call handling system 150. In other implementations, the voice site builder 180 is integrated into the call handling system 150. In yet other implementations, the voice site builder 180 is entirely contained within the content provider computing device, which periodically communicates data that defines the developed voice site to the call handling system 150 for approval and implementation.

Figure 2A:
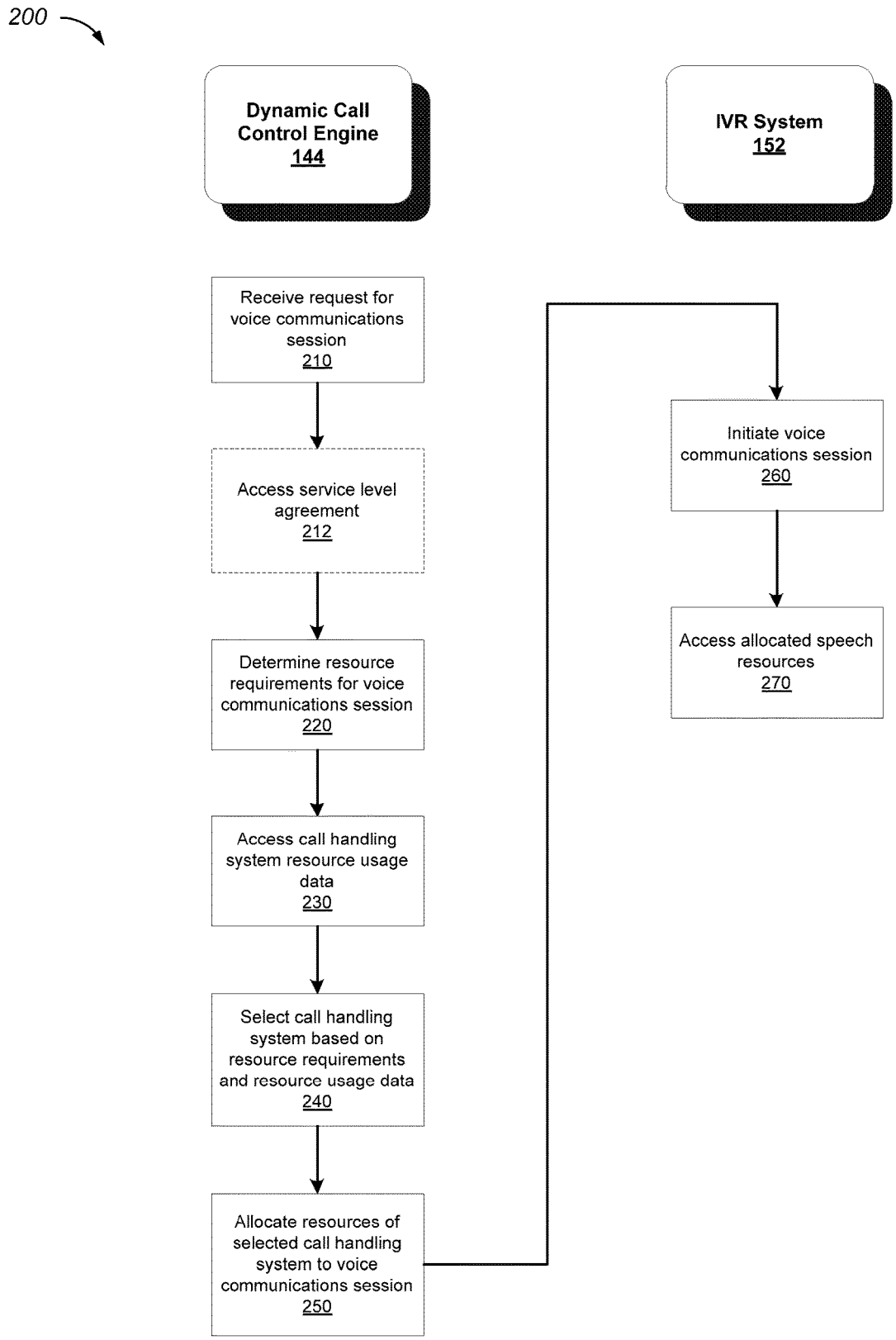
FIGS. 2A and 2B are flow charts illustrating an example process that selects a call handling system based on resources requirements associated with a voice communications session and dynamic resource usage data of call handling systems.

FIG. 2A illustrates a flow chart illustrating an example process 200 that selects a call handling system and allocates resources based on resources requirements associated with a voice communications session and dynamic resource usage data of call handling systems. In general, the process 200 analyzes the resource requirements for a voice communications session and, optionally, the service level agreement (SLA) to select an optimal call handling system that enables an IVR system to communicate with the user. The process 200 is described as being performed by a computer system comprising one or more computers, for example, the communications system 100 shown in FIG. 1A and FIG. 1B. While process 100 takes into account the resource requirements of the voice communication session and, optionally, the SLA for selecting an optimal speech resource, other implementations may only take into account the SLA without taking into account the resource requirements in selecting an optimal call handling system.

The dynamic call control engine 144 receives a request for initiating a voice communications session (210). As described above, a user may initiate a voice communications session with an IVR system by dialing a telephone number on the user device 110, and the request is forwarded to a session border control engine 132 of a data center 142 via the telephone network 120. The session border control engine 132 may then forward the request to the dynamic call control engine 144. For example, a content provider may have designed a voice site that allows users to interact with the voice site and order food delivery using voice communications. Once the service provider starts hosting the voice site in its data centers, callers can dial a phone number that represents the voice site, and the call request is forwarded to a dynamic call control engine of a data center.

The dynamic call control engine 144 optionally accesses the service level agreement associated with the call request (212). In some implementations, the SLA may include a concurrency requirement (i.e., how many calls can simultaneously access the application without being rejected) for the voice site. In some implementations, the SLA may include a resource requirement, e.g., an advanced ASR engine for processing natural language, for the voice site. For example, in the food delivery voice communications described above, since the food delivery service may include many menu items, the content provider wishes to use an advanced ASR to process the voice input by the users. Moreover, since the content provider expects that many users may call during the same hour (e.g., at 6:00 PM for dinner), the content provider may wish the service provider to guarantee that the user is to be connected to a call handling system not exceeding a maximum concurrency rate to ensure that the user's call will not be dropped. Prior to the deployment of the voice site, the content provider may have signed a SLA with the service provider, where the SLA provides, among other provisions, a provision to guarantee that an advanced ASR will be used for the voice site, and another provision to specify a maximum concurrency rate that is acceptable for the content provider. After a call is received from the user, the dynamic call control engine 144 may access the SLA associated with the food delivery voice site, and filter out the call handling systems that either do not support the advanced ASR, or currently have a concurrency rate higher than the maximum concurrency rate specified in the SLA.

The dynamic call control engine 144 then determines resource requirements for the voice communications session (220). The resource requirements may include one or more of a CPU usage, a memory usage, an average handle time, one or more speech resources, and a concurrency. The speech resources may include one or more of an automated speech recognition (ASR) engine, a text to speech (TTS) engine, a noise reduction engine, a voice recording engine, and an answering machine detection engine. In some implementations, the dynamic call control engine 144 determines the resource requirements for the voice communications session by querying the configuration database 182, where the resource requirements of the voice site associated with the voice communications session as configured by the content provider are stored. For example, the resource requirements for the food delivery voice site may be specified by the content provider at the time of the voice site design, and the resource requirements may be stored in the configuration database 182. The dynamic call control engine 144 may access the configuration database 182 to determine the resource requirements for the food delivery voice site, which in some cases may include the resource requirements for each voice page of the voice site.

The dynamic call control engine 144 accesses the call handling system resource usage data (230). The call handling system resource usage data may include computation usage data and resource usage data stored in the resource usage database 194 by the resource monitoring system 192. In some implementations, the resource monitoring system 192 may be configured to monitor the computation and resource usage of the call handling systems 150 at a fixed time interval as configured by a system administrator. In some other implementations, the resource monitoring system 192 may be configured to monitor the computation and resource usage of the call handling systems 150 dynamically at a variable time interval as a function of call traffic in a data center 142. In some other implementations, the resource monitoring system 192 may be configured to monitor the computation and resource usage of the call handling systems 150 dynamically at the time of the request to establish the voice communications session.

The dynamic call control engine 144 selects a call handling system based on the resource requirements for the voice communications session and the resource usage data of the call handling systems (240). In some implementations, the dynamic call control engine 144 may identify the call handling systems 150 that satisfy the resource requirements. If there are multiple call handling systems 150 satisfying the resource requirements, the dynamic call control engine 144 may select a call handling system 150 using a round robin selection scheme, where a call handling system 150 is selected by sequencing through a group of call handling systems in a predetermined order. Alternatively, the dynamic call control engine 144 may select a call handling system 150 with the highest computation power. In addition, the dynamic call control engine 144 may optionally select the call handling system based the requirements in the SLA.

In some implementations, the dynamic call control engine 144 may determine a score for each call handling system 150 based on the resource usage data. In some implementations, the score may be a weighted average of the different parameters of the resource usage data, where the weight for a parameter may be different for different voice sites. For example, for a voice site that demands high computation power, the CPU usage may be weighted more heavily than the concurrency of a call handling system 150. In the food delivery voice site example, the content provider may consider the concurrency of a call handling system to be an important factor to successfully carry out its service, and therefore the concurrency may be weighted more heavily than the CPU usage or the memory usage of a call handling system in determining the score for the call handling system.

The dynamic call control engine 144 may then allocate resources of the selected call handling system 150 to the voice communications session (250). For example, the dynamic call control engine 144 may identify the ports associated with an IVR and other speech resources for the voice communications session, and add these ports as metadata to an interaction flow document associated with the voice communications session, where the interaction flow document may be the VoiceXML script discussed earlier. As another example, the dynamic call control engine 144 may directly communicate the speech resource allocation information to the selected call handling system 150. In some implementations, the speech resource allocation information may include information identifying one or more resource types and one or more corresponding port identifiers. For example, the first voice page of the food delivery voice site may require a noise reduction engine to detect and reduce the background noise of the caller, and the last voice page of the food delivery voice site may require a voice recording engine to record the feedback of the user. The dynamic call control engine 144 may allocate these resources by adding the ports associated with these resources as metadata to the VoiceXML script of the voice site.

The IVR system 152 then initiates the voice communications session with the user (260). Referring to FIG. 1A, the selected IVR 152 receives the call and then interacts with the user device 110 to launch the voice application. The user is able to interact with the voice site by exchanging voice communications with the IVR 152. In particular, the user is able to receive information from the IVR 152 by hearing information spoken by the IVR 152 to the user and is able to provide information to the IVR 152 by speaking information into the phone.

In some implementations, the IVR 152 receives the call and then interacts with the user device 110 to launch a multimodal voice application. In the context of a multimodal voice application, the user device 110 may establish a parallel data communications session with the application server 140. The user is then able to interact with the voice solution platform by exchanging voice communications with the IVR 152 and exchanging data communications with the application server 140 in real-time during the overlapping communications sessions. In some implementations, the application server 140 may allocate a shared memory space in the data store 160 to store state data reflecting the interaction with the user during the two parallel communications sessions. In some implementations, the IVR 152, rather than the application server 140, allocates the shared memory space in the data store 160. The application server 140 and the IVR 152 are able to read data from and/or write data to the shared memory space. For example, the application server 140 may inform the IVR 152 of the location of the shared memory space and may setup access rights with the data store 160 to ensure that the application server 140 and the IVR 152 are each able to read data from and/or write data to the shared memory space in real-time during the communications sessions.

The IVR system 152 accesses the allocated speech resources during the voice communications system (270). In some implementations, the IVR system 152 may connect to and access the allocated speech resource via a port identified by the port identifier. The IVR system 152 may communicate with the allocated speech resource to process the voice data received from the user. For example, for the food delivery voice site described above, when the IVR system 152 processes the first voice page, the IVR system 152 may recognize that a port associated with the noise reduction engine was added as metadata to the VoiceXML script. The IVR system 152 will then establish a connection with the noise reduction engine using the specified port to access the noise reduction engine during the voice communications session. Similarly, when the IVR system 152 processes the last voice page, the IVR system 152 may recognize that a port associated with the voice recording engine was added as metadata to the VoiceXML script. The IVR system 152 will then establish a connection with the voice recording engine using the specified port to access the voice recording engine during the voice communications session.

Figure 2B:
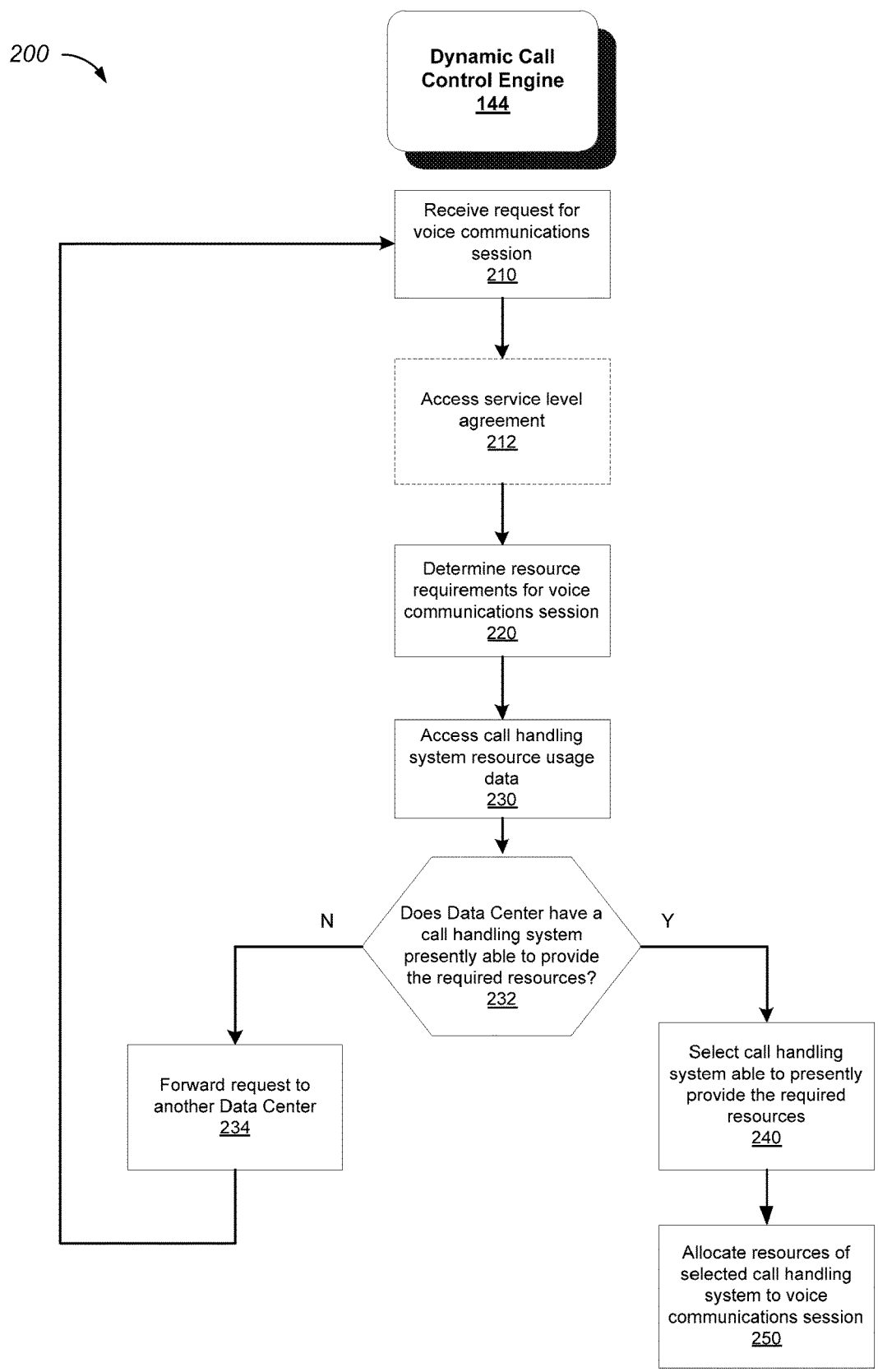

FIG. 2B depicts a flow chart illustrating an example process 200 that determines whether a data center includes a call handling system 150 that presently is capable of providing the required resources for the voice communications session. As described previously, after receiving the request for the voice communications session (210), the dynamic call control engine 144 optionally accesses the service level agreement for the voice communications session (212). The dynamic call engine 144 then determines the resource requirements for the voice communications session (220). The dynamic call engine 144 then accesses the call handling system resource usage data (230).

The dynamic call engine 144 may determine whether the data center presently has a call handling system that is able to provide the required resources (232). In some implementations, the dynamic call engine 144 may determine whether the data center 142 presently has a call handling system that is able to provide the required resources by computing a score for each of the call handling systems in the data center 142, and determining whether any one of the scores exceeds a predetermined threshold score associated with the voice site. In some implementations, one or more resource requirements may be critical for the voice site. For example, a sophisticated ASR engine may be required by the SLA of the voice site. The dynamic call engine 144 may determine whether the data center 142 presently has a call handling system that is able to provide the required resources by determining whether any one of the call handling systems 150 can presently support the sophisticated ASR engine.

If the dynamic call engine 144 determines that the data center presently has a call handling system that is able to provide the required resources, the dynamic call engine 144 selects a call handling system in the data center that is presently able to provide the required resources to the user (240). The dynamic call control engine 144 may allocate resources of the selected call handling system to the voice communications session (250).

If the dynamic call engine 144 determines that the data center presently does not have a call handling system that is able to provide the required resources, the dynamic call engine 144 forwards the request to another data center 142 (234). In some implementations, the dynamic call engine 144 selects another data center 142 to forward the request to using a round robin selection scheme, where a data center is selected by sequencing through a group of data centers in a predetermined order. In some implementations, the dynamic call engine 144 selects another data center 142 to forward the request to using the resource usage data stored in the resource usage database 194 of another data center 142. For example, the dynamic call engine 144*a* may select the data center 142*b* to forward the request to using the resource usage data stored in the resource usage database 194*b*, which may indicate that the call handling system 150*e* is presently able to satisfy the resource requirements of the requested voice communications session. In some implementations, once the request is received at a new data center 142, the new data center 142 may repeat one or more of the steps 210, 212, 220, 230, 232, 234, 240, and 250 as described above.

The disclosed and other examples can be implemented as one or more computer program products, i.e., one or more modules of computer program instructions encoded on a computer readable medium for execution by, or to control the operation of, data processing apparatus. The implementations can include single or distributed processing of algorithms. The computer readable medium can be a machine-readable storage device, a machine-readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communications network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer can include a processor for performing instructions and one or more memory devices for storing instructions and data. Generally, a computer can also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data can include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this document may describe many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. A method comprising:
hosting, by a processor, a plurality of interaction handling systems for a plurality of entities, the plurality of entities providing customer service via one or more of the plurality of interaction handling systems;
receiving, by the processor, a request to establish a communication session involving an end user device;
dynamically selecting a particular interaction handling system from the plurality of interaction handling systems based on the request, the dynamically selecting including:
 determining, by the processor, a resource requirement for the communication session;
 accessing, by the processor, resource usage data for the plurality of interaction handling systems; and
 identifying, by the processor, the particular interaction handling system from among the interaction handling systems based on the resource usage data and the resource requirement;
allocating, by the processor, resources of the particular interaction handling system to the communication session, wherein the allocating of resources includes adding information on the allocated resources to an interaction flow document associated with the communication session, wherein the interaction flow document includes computer instructions for automatically handling the communication session, the automatic handling including receiving and processing inputs from the end user device during the communication session, and providing outputs in response;
transmitting, by the processor, signaling messages for establishing a connection between the end user device and the particular interaction handling system, wherein the communication session is conducted over the connection;
in response to establishing the connection, executing, by the processor, the interaction flow document for automatically handling the communication session; and
invoking, by the processor, the allocated resource, during the automatic handling of the communication session, based on the added information in the interaction flow document.

2. The method of claim 1, further comprising:
accessing a service level agreement associated with the communication session; and
determining an additional resource requirement for the communication session based on the service level agreement.

3. The method of claim 1, wherein the communication session is a voice communication session, and the interaction handling system is a call handling system.

4. The method of claim 1, wherein the call handling system includes an interactive voice response system.

5. The method of claim 1, wherein the plurality of interaction handling systems are associated with a first data center.

6. The method of claim 5, further comprising:
determining that the resource usage data of the multiple interaction handling systems do not satisfy the resource requirement for the communication session; and
in response to determining that the resource usage data of the multiple interaction handling systems do not satisfy the resource requirement, forwarding the request to a second data center.

7. The method of claim 6, wherein forwarding the request to the second data center further comprises:
determining that an interaction handling system of the second data center satisfies the resource requirement before forwarding the request.

8. The method of claim 1, wherein the resource requirement comprises one or more of a CPU usage, a memory usage, an average handle time, one or more speech resources, a throughput, a network congestion, and a concurrency.

9. The method of claim 8, wherein the one or more speech resources comprise one or more of an automated speech recognition (ASR) engine, a text to speech (TTS) engine, a noise reduction engine, a voice recording engine, and an answering machine detection engine.

10. The method of claim 1, further comprising:
monitoring, by a resource monitoring system, the resource usage data; and
storing the resource usage data in a resource usage database.

11. The method of claim 10, wherein monitoring the resource usage data comprises monitoring the resource usage data for the interaction handling systems associated with a data center.

12. The method of claim 10, wherein monitoring the resource usage data comprises monitoring the resource usage data for the interaction handling systems associated with multiple data centers.

13. The method of claim 1, wherein the particular interaction handling system includes multiple interactive voice response (IVR) systems, and
wherein selecting the particular interaction handling system further comprises selecting an IVR system of the multiple IVR systems.

14. The method of claim 1, wherein selecting a particular interaction handling system from among the multiple interaction handling systems further comprises:
for each respective interaction handling system of the multiple interaction handling systems, determining a respective score for the respective interaction handling system based on the resource usage data associated with the respective interaction handling system; and
selecting the particular interaction handling system based on the determined scores for the multiple interaction handling systems.

15. A system comprising:
one or more processors; and
one or more memory devices, wherein the one or more memory devices have instructions stored therein that, when executed by the one or more processors, cause the one or more processors to respectively:
host a plurality of interaction handling systems for a plurality of entities, the plurality of entities providing customer service via one or more of the plurality of interaction handling systems;
receive a request to establish a communication session involving an end user device;
dynamically select a particular interaction handling system from the plurality of interaction handling systems based on the request, wherein the instructions that cause the processor to dynamically select include instructions that cause the processor to:
determine a resource requirement for the communication session;
access resource usage data for the plurality of interaction handling systems; and
identify the particular interaction handling system from among the interaction handling systems based on the resource usage data and the resource requirement;
allocate resources of the particular interaction handling system to the communication session, wherein the instructions that cause the processor to allocate include instructions that cause the processor to add information on the allocated resources to an interaction flow document associated with the communication session, wherein the interaction flow document includes computer instructions for automatically handling the communication session, the automatic handling including receiving and processing inputs from the end user device during the communication session, and providing outputs in response;
transmit signaling messages for establishing a connection between the end user device and the particular interaction handling system, wherein the communication session is configured to be conducted over the connection;
in response to establishing the connection, execute the interaction flow document for automatically handling the communication session; and
invoke the allocated resource, during the automatic handling of the communication session, based on the added information in the interaction flow document.

16. The system of claim 15, wherein the communication session is a voice communication session, and the interaction handling system is a call handling system.

17. The system of claim 15, wherein the call handling system includes an interactive voice response system.

18. The system of claim 15, wherein the plurality of interaction handling systems are associated with a first data center.

19. The system of claim 15, wherein the instructions further cause the processor to:
determine that the resource usage data of the multiple interaction handling systems do not satisfy the resource requirement for the communication session; and
in response to determining that the resource usage data of the multiple interaction handling systems do not satisfy the resource requirement, forward the request to a second data center.

20. The system of claim 15, wherein the resource requirement comprises one or more of a CPU usage, a memory usage, an average handle time, one or more speech resources, a throughput, a network congestion, and a concurrency.

* * * * *